United States Patent [19]
Limbacher

[11] 3,920,107
[45] Nov. 18, 1975

[54] SELF-ALIGNING CLUTCH RELEASE BEARING ARRANGEMENT

[75] Inventor: Bernhard Limbacher, Niederwerrn, Germany

[73] Assignee: Fichtel & Sachs AG, Schweinfurt am Main, Germany

[22] Filed: July 31, 1974

[21] Appl. No.: 493,272

[30] Foreign Application Priority Data
Aug. 16, 1973  Germany............................ 7329767

[52] U.S. Cl. .................. 192/98; 308/184; 308/233; 308/236
[51] Int. Cl.² .................... F16D 23/14; F16D 27/00
[58] Field of Search ....... 192/110 B, 98; 308/189 R, 308/193, 194, 233, 235

[56] References Cited
UNITED STATES PATENTS

| | | |
|---|---|---|
| 2,785,023 | 3/1957 | Naumann............................ 308/233 |
| 3,272,576 | 9/1966 | Greby ................................. 308/233 |
| 3,788,437 | 1/1974 | Camp.................................. 308/184 |
| 3,815,715 | 6/1974 | Maucher............................. 308/236 |

Primary Examiner—M. Henson Wood, Jr.
Assistant Examiner—Richard A. Bertsch
Attorney, Agent, or Firm—Hans Berman

[57] ABSTRACT

A release bearing for an automotive friction clutch in which the normally stationary outer bearing ring is mounted with radial play on an axially slidable sleeve which may be axially moved by a release element. A radially inwardly extending flange extends from the outer bearing ring towards the sleeve and is arranged between a radially extending surface transmitting axial moving force from the slidable sleeve and a radially extending retaining ring. Resilient centering elements are arranged between the outer ring flange and the slidable sleeve.

6 Claims, 3 Drawing Figures

SELF-ALIGNING CLUTCH RELEASE BEARING ARRANGEMENT

This invention relates to release bearings for friction clutches of the type commonly employed in automotive vehicles, and particularly to a self-aligning clutch release bearing arrangement which comprises a rotating inner bearing ring, a co-axial stationary outer bearing ring, and a slidable sleeve axially movable by a release element. In the arrangement of the invention, the outer ring has a radially inwardly extending flange, and the outer ring flange is guided on the sleeve with radial play between a radially extending retaining ring and a radially extending surface transmitting axial moving force from the slidable sleeve, the surface being axially spaced from the retaining ring.

A clutch release bearing arrangement of this general type has been disclosed in German Utility Model No. 7,222,842. The radial play between the bearing and the slidable sleeve makes it possible to compensate for misalignment of the axes of the clutch and the slidable sleeve during the release movement. In this known arrangement, the retaining ring serves only for connecting the flange of the outer bearing ring to the sleeve. Thus, the release bearing rests with its flange on the sleeve when the bearing is not under load. To avoid noise at this point, it is necessary to press this bearing constantly with a slight force against the release elements of the clutch.

German Published Patent Application No. 2,200,684 discloses a release bearing of the type comprising a rotating outer ring and a stationary inner ring. A radially resilient spring is arranged between the inner ring and a slidable sleeve. This increases the radial space requirements in the bearing.

It is a primary object of the present invention to provide a self-aligning clutch release bearing arrangement of the type first described hereinabove which operates without noise and whose self-alignment functions with a minimum of wear.

This and other objects are accomplished in accordance with this invention by arranging a resilient centering means for the bearing between the outer bearing ring flange and the slidable sleeve whereon it is guided with radial play. This maintains the bearing substantially centered in respect of the carrying sleeve even under no load, thus requiring less friction when the bearing is self-aligned during operation of the clutch. Furthermore, it prevents rattling noises when the bearing is load-free.

According to one preferred embodiment, the resilient centering means is integral with the retaining ring, which provides a considerable advantage in the manufacture as well as in the mounting of the bearing since only a single structural part is needed for axial retention and radial resilience of the bearing.

A particularly space-saving arrangement increasing neither the diameter nor the axial length of the entire bearing is provided when the centering means comprises a plurality of spring tongues extending substantially axially from the retaining ring towards the force transmitting surface. In this preferred embodiment, the flange of the outer bearing ring has an inner surface radially spaced from the slidable sleeve and the spring tongues resiliently engage the inner surface of the outer ring flange in a radial direction.

The above and other features, objects and many of the attendant advantages of this invention will readily be appreciated as the same becomes better understood by reference to the following detailed description of preferred embodiments thereof, when considered in connection with the appended drawing in which.

Figure 1:
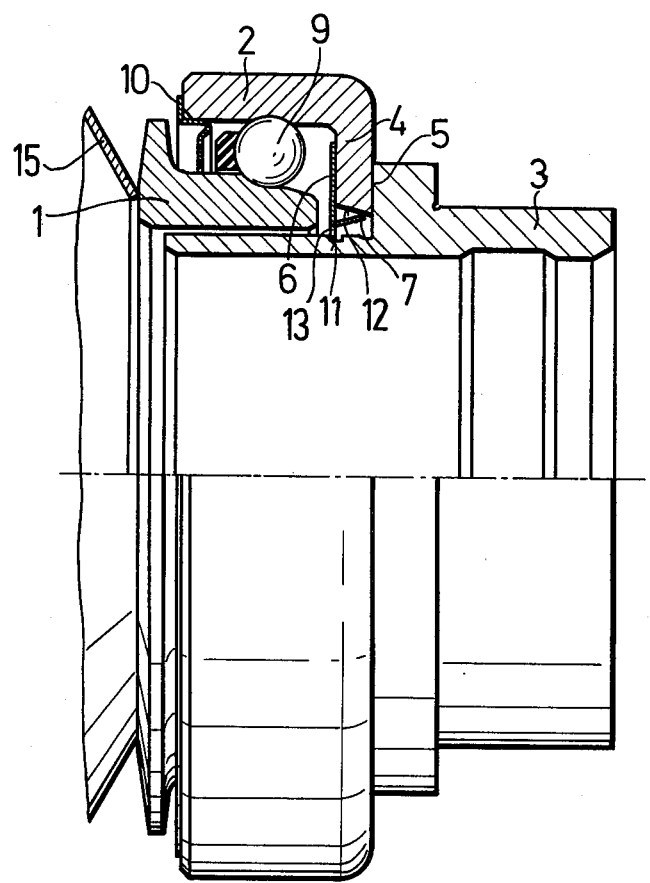
FIG. 1 is a side elevational view of a clutch release bearing according to the invention, the upper half being shown in section.

Referring now to the drawing and first to FIG. 1, there is shown as much of the clutch release bearing arrangement for the friction clutch of an automotive vehicle as required for an understanding of the invention.

A generally cylindrical carrier sleeve 3 is axially slidably mounted on a supporting tube (not shown) which extends from the transmission housing of an automotive vehicle (also not shown) towards the associated clutch of which only a portion of diaphragm spring 15 is seen in FIG. 1.

The release bearing carried by slidable sleeve 3 comprises stationary outer bearing ring 2 having radially inwardly extending flange 4. Carrier sleeve 3 has an annular shoulder providing radially extending surface 5 which transmits axial moving force from slidable sleeve 3 to flange 4 which abuts surface 5. Bearing balls 9 are in simultaneous rolling engagement with outer ring 2 and rotating inner bearing ring 1 in a generally conventional ball bearing arrangement, the inner bearing ring having a surface engaging diaphragm spring 15 of the clutch (not shown). Labyrinth seal 10 is mounted on bearing ring 2 to prevent penetration of dirt into, and escape of lubricant from, the bearing.

Carrier sleeve 3 defines circumferential groove 11 which receives retaining lugs 13 of retaining ring 6. The retaining ring retains the bearing on sleeve 3, holding flange 4 of the outer bearing ring between it and surface 5. Retaining ring 6 is not pre-stressed in the axial direction and serves merely to mount the bearing on the carrier sleeve.

Figure 2:
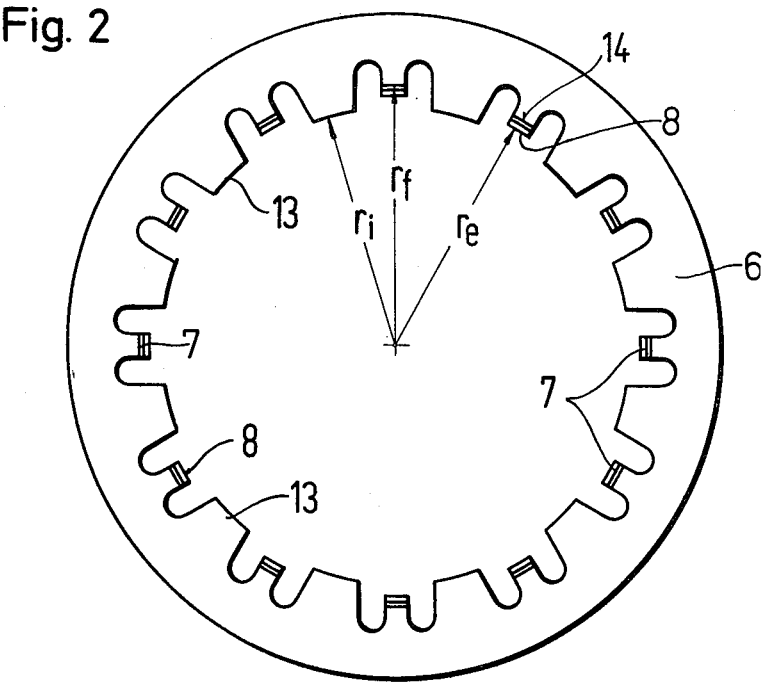
FIG. 2 is a plan view of the retaining ring with the spring tongues.
Figure 3:
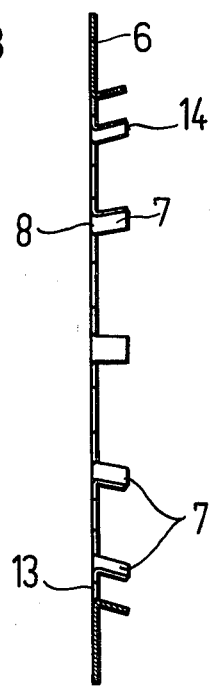
FIG. 3 is a side elevational view of FIG. 2.

As is seen in FIGS. 2 and 3, a plurality of retaining lugs 13 extend from the inner circumference of retaining ring 6 alternately with lugs carrying spring tongues 7 which are resilient in a radial direction. The retaining lugs extend substantially in the plane of retaining ring 6 and engage sleeve 3 while the lugs carrying the spring tongues form base 8 for tongues 7, these lugs being bent along the base to form the tongues. The radial distance $r_f$ between the centers of bases 8 of the spring tongues and the common axis is greater than distance $r_i$ from the axis to the centers of the radially inner ends of retaining lugs 13. This structure is advantageous in production and provides safe functioning of the device, the preferred dimensioning keeping the inner portion of ring 6, which is mounted in groove 11 of sleeve 3, free from the spring forces produced by tongues 7.

Also, recesses are stamped out of the ring material on either side of each spring tongue 7, the length $l$ of spring tongues 7 in the radial direction from base 8 to free end 14 thereof being greater than the difference between distance $r_f$ and the distance $r_i$. This makes it possible to obtain a sufficient spring length of tongues 7 although the bases of the tongues are close to the inner diameter of the retaining ring.

In the assembled condition of the bearing shown in FIG. 1, the spring tongues resiliently engage the inner surface 12 of flange 4 of the outer bearing ring with a radially outward component extending towards force transmitting surface 5 and biased against inner flange surface 12. The inner surface 12 conically tapers outwardly from surface 5 towards retaining ring 6 in a direction opposite to the taper of the spring tongues towards flange surface 12. In other words, the inner diameter of flange 4 adjacent retaining ring 6 is greater than that adjacent surface 5. The inner flange diameter adjacent ring 6 is a little greater than the distance $r_F$ from the axis to the centers of free ends 14 of tongues 7 in retaining ring 6 before assembly. This arrangement and dimensioning facilitates the assembly of outer bearing ring and retaining ring considerably since the obliquely outwardly extending tongues 7 will glide along the tapered flange surface 12 during assembly and thus change from a condition in which they are not tensioned in the radial direction into the operative tensioned condition.

The clutch release bearing arrangement described hereinabove operates in the following manner:

In assembling the bearing, the outer bearing ring is mounted on carrier sleeve 3 by engaging ring flange 4 with surface 5 of the shoulder of sleeve 3. Retaining ring 6 is now moved on the sleeve into engagement with outer bearing ring flange 4, which simultaneously causes spring tongues 7 to engage flange surface 12 resiliently. The proper dimensioning of the distance between the centers of the free ends 14 of tongues 7 and the inner diameter of flange 4 enables the free tongue ends to glide along the conical flange surface 12 until retaining lugs 13 of ring 6 are engaged in circumferential groove 11 of sleeve 3. After the outer bearing ring has thus been mounted on sleeve 3, balls 9, inner bearing ring 1 and seal 10 are assembled on the carrier sleeve. The resilient centering means 7 provides radial movement of the bearing in relation to the carrier sleeve so as to compensate automatically for any misalignment during clutch release between sleeve 3 and the rotating parts of the clutch. The radially resilient tongues 7 will also prevent rattling noises due to strong motor vibration or during travel over rough roads. The tongues at least substantially center the bearing when the clutch is engaged. On the other hand, when the clutch is released, the automatic alignment assured by spring tongues 7 is not encumbered by unnecessary radial movements of the bearing.

Under certain operating conditions, it will be useful to hold the release bearing in constant rotative engagement with the clutch parts, which will prevent the disengagement of outer bearing ring 2 from surface 5 of carrier sleeve 3 caused by vibrations of the engaged clutch.

It should be understood that the foregoing disclosure relates only to preferred embodiments of the invention and that it is intended to cover all changes and modifications of the embodiments of this invention herein chosen for the purpose of the disclosure which do not constitute departures from the spirit and scope of the invention set forth in the appended claims.

What is claimed is:

1. A clutch release bearing arrangement comprising:
   a. a rotating inner ring;
   b. a stationary outer ring having a radially inwardly extending flange,
      1. the rings having a common axis;
   c. an axially slidable sleeve,
      1. the outer ring flange being guided on the sleeve with radial play;
   d. a radially extending retaining ring;
   e. a radially extending surface transmitting axial moving force from the slidable sleeve,
      1. the surface being axially spaced from the retaining ring, and
      2. the outer ring flange being arranged between the retaining ring and the force transmitting surface; and
   f. resilient centering means integral with said retaining ring and arranged between the outer ring flange and the slidable sleeve,
      1. said resilient centering means including a plurality of spring tongues extending substantially axially from the retaining ring towards the force transmitting surface,
      2. the outer ring flange having an inner surface radially spaced from the slidable sleeve and the spring tongues resiliently engaging the inner surface of the outer ring flange in a radial direction.

2. An arrangement as set forth in claim 1, wherein the retaining ring has an inner circumference, a plurality of retaining lugs extending from the inner circumference alternately with lugs carrying the spring tongues, the retaining lugs extending substantially in the plane of the retaining ring and engaging the slidable sleeve, the lugs carrying the spring tongues forming a base for the tongues, the latter lugs being bent along said base to form the tongues, and the distance between the centers of the bases being greater than that of the radially inner ends of the retaining lugs.

3. An arrangement as set forth in claim 2, wherein the length of the spring tongues from the base to the free end thereof is greater than the difference between the distance of the centers of the bases and the radially inner ends of the retaining lugs from the common axis.

4. An arrangement as set forth in claim 1, wherein the spring tongues have a radially outward component extending towards the force transmitting surface.

5. An arrangement as set forth in claim 1, wherein the inner surface of the outer ring flange conically tapers outwardly from the force transmitting surface towards the retaining ring.

6. An arrangement as set forth in claim 5, wherein the distance of the centers of the free ends of the spring tongues from the common axis is smaller than the radius of the inner surface of the outer ring flange at the surface edge adjacent the retaining ring.

* * * * *